US012682303B2

(12) United States Patent
Hencken et al.

(10) Patent No.: US 12,682,303 B2
(45) Date of Patent: Jul. 14, 2026

(54) METHOD FOR DEVICE MONITORING

(71) Applicant: ABB Schweiz AG, Baden (CH)

(72) Inventors: Kai Hencken, Lörrach (DE); Massimo Scarpellini, Dalmine (IT); Marco Testa, Romano di Lombardia (IT)

(73) Assignee: ABB Schweiz AG, Baden (CH)

( * ) Notice: Subject to any disclaimer, the term of this patent is extended or adjusted under 35 U.S.C. 154(b) by 1238 days.

(21) Appl. No.: 17/560,921

(22) Filed: Dec. 23, 2021

(65) Prior Publication Data

US 2022/0114519 A1     Apr. 14, 2022

Related U.S. Application Data

(63) Continuation of application No. PCT/EP2020/067515, filed on Jun. 23, 2020.

(30) Foreign Application Priority Data

Jun. 28, 2019     (EP) .................................... 19183432

(51) Int. Cl.
$G06Q\ 10/0635$          (2023.01)
$G06F\ 30/20$          (2020.01)
          (Continued)

(52) U.S. Cl.
CPC ......... $G06Q\ 10/0635$ (2013.01); $G06F\ 30/20$ (2020.01); $G06F\ 2111/08$ (2020.01); $G06F$ $2119/04$ (2020.01)

(58) Field of Classification Search
CPC . G06Q 10/0635; G06F 30/20; G06F 2111/08; G06F 2119/04; G06F 17/18; G05B 23/0283; G07C 3/14
See application file for complete search history.

(56)                References Cited

U.S. PATENT DOCUMENTS 8,712,726 B2 *     4/2014   Li ...................... G05B 23/0283
                                                                     702/179
10,733,813 B2 *    8/2020   Ide ...................... G06Q 10/1093
                 (Continued)

FOREIGN PATENT DOCUMENTS

CN          102520669 A   *   6/2012
CN          104793605 A       7/2015
                 (Continued)

OTHER PUBLICATIONS

Nagi et al., "Residual-life distributions from component degradation signals: A Bayesian approach," *IIE Transactions*, 37(6): 543-557 (Jun. 2005).
                 (Continued)

*Primary Examiner* — Eunhee Kim
(74) *Attorney, Agent, or Firm* — Fitch Even Tabin & Flannery LLP

(57)                ABSTRACT

A method for device monitoring includes: providing a plurality of fleet measurement data for at least one device, where the plurality of fleet measurement data includes a number of fleet device data measurements "Nfleet;" providing a plurality of device measurement data for a monitored device, where the plurality of device measurement data includes a number of monitor device data measurements "Ndata;" determining a fleet distribution "Fdist" determined as a distribution of differences between consecutive measurements of the plurality of fleet measurement data; determining a device distribution "Ddist" determined as a distribution of differences between consecutive measurements of the device measurement data; determining an effective number of data measurements "Neff;" and determining a probability of failure of the monitored device, the determining including utilising the fleet distribution "Fdist," the device distribution "Ddist," the number of monitor device data (Continued)

measurements "Ndata," and the effective number of data measurements "Neff."

22 Claims, 3 Drawing Sheets

(51) Int. Cl.
  _G06F 111/08_        (2020.01)
  _G06F 119/04_        (2020.01)

(56)                References Cited

U.S. PATENT DOCUMENTS

2007/0173993 A1*  7/2007  Nielsen .................. G06Q 10/06
                                                          701/33.4
2015/0100284 A1    4/2015  Teravainen et al.

FOREIGN PATENT DOCUMENTS

| CN | 106447210 A |   | 2/2017 |   |
|----|-------------|---|--------|---|
| CN | 107315138 A |   | 11/2017 |   |
| CN | 110135733 A | * | 8/2019 | ................ H02J 3/00 |

OTHER PUBLICATIONS

Zaidan et al., "Bayesian hierarchical models for aerospace gas turbine engine prognostics," _Expert Systems with Applications_, 42(1): 539-553 (Aug. 23, 2014).

European Patent Office, International Search Report in International Patent Application No. PCT/EP2020/067515, 3 pp. (Sep. 22, 2020).

European Patent Office, Written Opinion in International Patent Application No. PCT/EP2020/067515, 6 pp. (Sep. 22, 2020).

The Patent Office of the People's Republic of China, Office Action in Chinese Patent Application No. 202080040923.3, 14 pp. (Jun. 12, 2024).

Tang et al., "Remaining Useful Life Prediction of Lithium-Ion Batteries Based on the Wiener Process with Measurement Error," _energies_, 7(2): 520-547 (Jan. 23, 2014).

Whitmore, "Estimating Degradation By a Wiener Diffusion Process Subject to Measurement Error," _Lifetime Data Analysis_, 1(3): 307-319 (Sep. 1995).

European Patent Office, Extended European Search Report in European Patent Application No. 19183432.4, 6 pp. (Jan. 9, 2020).

* cited by examiner

METHOD FOR DEVICE MONITORING

CROSS-REFERENCE TO PRIOR APPLICATIONS

This application is a continuation of International Patent Application No. PCT/EP2020/067515, filed on Jun. 23, 2020, which claims priority to European Patent Application No. EP 19183432.4, filed on Jun. 28, 2019. The entire disclosure of both applications is hereby incorporated by reference herein.

FIELD

One or more embodiments of the present disclosure relates to a method for device monitoring, an apparatus for device monitoring, and to a computer program element and non-transitory computer readable medium.

BACKGROUND

Degradation models track the change of a relevant variable in order to measure or predict its future evolution until a specific limit has been reached, upon which the device is out of specification or not able to perform its intended function, which is often called a "soft failure". An important aspect in modelling the lifetime of devices is that the future evolution of these degradation variables needs to be calculated as precisely as possible. The individual behaviour of a device needs to be simulated or predicted, for which there may not be much existing measurement data or observations. Whereas there is often more measurement data or observations for one or more similar devices, where the sum of that measurement data is termed fleet data. The predicted failures, failure times or the probability of failure (PoF(t)) distribution, can then be used in combination with other data to infer the status of the device and from it possible service or maintenance activities to avoid failures or outages or to schedule maintenance based on the predictive lifetime.

Combining prior knowledge in order to make the parameter estimation more accurate for an additional measurement is a well known method in statistics, making use of, for example, Bayesian statistics. This is often used to determine parameters of individual devices or improve the knowledge of individual devices combining both prior data and measurement. Also using past data in order to predict the future evolution and from this the probability of failure is already well known.

US 2015/0100284 describes a system to use both fleet and measurement data in order to calculate the hazard rate of a system and from this the future reliability.

N. Z. Gebraeel et at "Residual Life Distributions from Component Degradation Signals: A Bayesian Approach" IIE Transactions 37, 543-557 (2005) describe the combination of fleet/prior data together with individual degradation measurements.

S. Tang et al "Remaining Useful Life Prediction of Lithium-Ion Batteries Based on the Wiener Process with Measurement Error" Energies 7, 520-547 (2014) describe an approach to combine both fleet data and increasing measurement data.

G. A. Whitmore "Estimating Degradation By a Wiener Diffusion Process Subject to Measurement Error" Lifetime Data Analysis 1, 307-319 (1995) describes the background of MLE parameter estimation for one of the embodiments. As part of the improvement it is also described how only part of the parameters (the measurement error) can be incorporated to improve the prediction.

However, the authors have found that existing techniques cannot accurately enable a new or relatively new device to be accurately modelled to determine a probability of its failure.

There is a need to address this issue.

SUMMARY

One or more embodiments of the present disclosure may provide a method for device monitoring. The method may include: a) providing a plurality of fleet measurement data for at least one device, wherein the plurality of fleet measurement data comprises a number of fleet device data measurements "Nfleet;" b) providing a plurality of device measurement data for a monitored device, wherein the plurality of device measurement data comprises a number of monitor device data measurements "Ndata;" c) determining a fleet distribution "Fdist" determined as a distribution of differences between consecutive measurements of the plurality of fleet measurement data; d) determining a device distribution "Ddist" determined as a distribution of differences between consecutive measurements of the device measurement data; e) determining an effective number of data measurements "Neff;" and f) determining a probability of failure of the monitored device, the determining comprising utilising the fleet distribution "Fdist," the device distribution "Ddist," the number of monitor device data measurements "Ndata," and the effective number of data measurements "Neff."

Therefore, it would be advantageous to have an improved ability to monitor a device in order to provide information relating to its anticipated lifetime to failure.

BRIEF DESCRIPTION OF THE DRAWINGS

One or more embodiments of the present disclosure will be described in even greater detail below based on the exemplary figures. The present disclosure is not limited to the exemplary embodiments. Other features and advantages of various embodiments of the present disclosure will become apparent by reading the following detailed description with reference to the attached drawings which illustrate the following.

DETAILED DESCRIPTION

Figure 1:
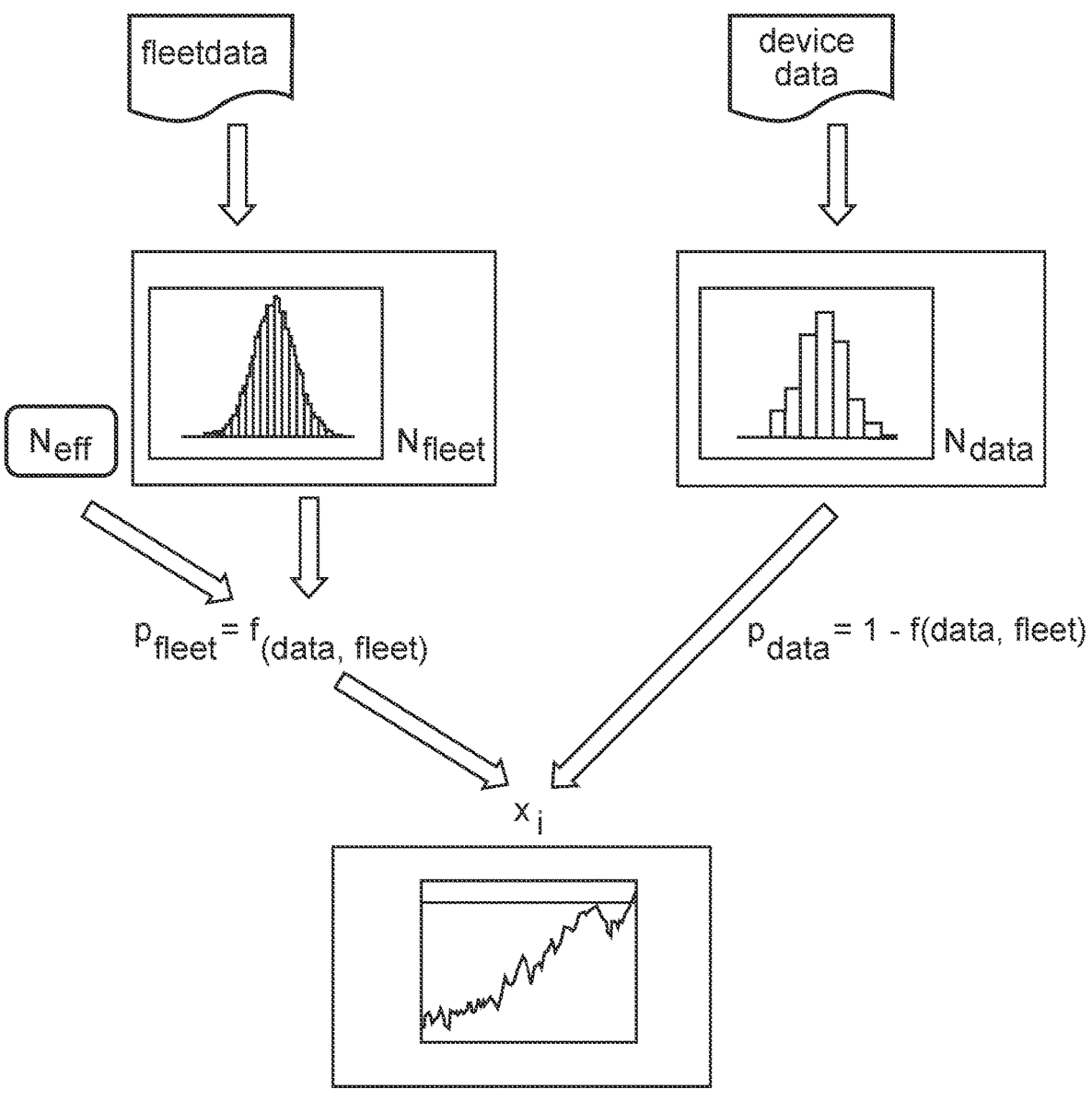
FIG. 1 shows an example of an approach for the determination of a device probability of failure.

In a first aspect, there is provided a method for device monitoring, comprising:

a) providing a plurality of fleet measurement data for at least one device, wherein the plurality of fleet measurement data comprises a number of fleet device data measurements "$N_{fleet}$";

b) providing a plurality of device measurement data for a monitored device, wherein the plurality of device measurement data comprises a number of monitor device data measurements "$N_{data}$";

c) determining a fleet distribution "$F_{dist}$" determined as a distribution of differences between consecutive measurements of the plurality of fleet measurement data;

d) determining a device distribution "$D_{dist}$" determined as a distribution of differences between consecutive measurements of the device measurement data;

e) determining an effective number of data measurements "$N_{eff}$";

f) determining a probability of failure of the monitored device, the determining comprising utilising the fleet distribution "$F_{dist}$", the device distribution "$D_{dist}$", the number of monitor device data measurements "$N_{data}$", and the effective number of data measurements "$N_{eff}$".

In an example, in step a) the plurality of fleet measurement data are for a plurality of devices, and wherein in step c) determination of the fleet distribution "$F_{dist}$" comprises determining differences between consecutive measurements for each of the devices.

In an example, in step e) determining the effective number of data measurements "$N_{eff}$" comprises utilizing the fleet distribution "$F_{dist}$" and/or the device distribution "$D_{dist}$".

In an example, in step e) the effective number of data measurements "$N_{eff}$" is determined as a fixed value globally. This value can be either preselected from practical experience or determined using the spread of measurements, that is fleet data for different devices entering $N_{fleet}$ and/or $F_{dist}$ In an example, step f) comprises:

X1) taking a start measurement datum from the plurality of device measurement data;

X2) selecting either the fleet distribution "$F_{dist}$" or the device distribution "$D_{dist}$", comprising utilization of at least one probability of selection;

X3) selecting a data value from the distribution selected in step X2); and wherein the probability of failure of the monitored device is determined from a statistical simulation technique starting from the value selected in X1 and using consecutive values selected in a plurality of steps X3).

In an example, the statistical simulation technique is a Monte Carlo method involving the simulation of a large number of possible future paths.

In an example, in step X2) a probability of selecting the fleet distribution "$F_{dist}$" is calculated on the basis of the effective number of data measurements divided by the sum of the effective number of data measurements and the number of monitor device data measurements "$N_{eff}/(N_{eff}+N_{data})$", and wherein in step A2) a probability of selecting the device distribution "$D_{dist}$" is calculated on the basis of the number of monitor device data measurements divided by the sum of the effective number of data measurements and the number of monitor device data measurements "$N_{data}/(N_{eff}+N_{data})$".

In an example, step X3) comprises randomly selecting the data value from the distribution selected in step X2).

In an example, step f) comprises:

Y1) taking a start measurement datum from the plurality of device measurement data;

Y2) selecting either the fleet distribution "$F_{dist}$" or the device distribution "$D_{dist}$", comprising utilization of at least one probability of selection; and wherein the probability of failure of the monitored device is determined comprising utilization of a mathematically known first-passage distribution for the initial value determined in Y1) and the distribution determined in Y2).

In an example, in step Y2) a probability of selecting the fleet distribution "$F_{dist}$" is calculated on the basis of the effective number of data measurements divided by the sum of the effective number of data measurements and the number of monitor device data measurements "$N_{eff}/(N_{eff}+N_{data})$", and wherein in step Y2) a probability of selecting the device distribution "$D_{dist}$" is calculated on the basis of the number of monitor device data measurements divided by the sum of the effective number of data measurements and the number of monitor device data measurements "$N_{data}/(N_{eff}+N_{data})$".

In an example, step f) comprises:

A1) taking a start measurement datum from the plurality of device measurement data;

A2) selecting either the fleet distribution "$F_{dist}$" or the device distribution "$D_{dist}$", comprising utilization of at least one probability of selection;

A3) selecting a data value from the distribution selected in step A2);

A4) determining a calculated device measurement value determined as the data value selected in step A3) added to the start measurement value for a first iteration or determined as the data value selected in step A3) added to an existing calculated device measurement value for iterations after the first iteration;

A5) iterating steps A2) to A4) until after a number of iterations the calculated device measurement value reaches a threshold value, and wherein determination of the probability of failure comprises utilizing the number of iterations to reach the threshold value.

In an example, the method comprises:

A6) carrying out step A5) a plurality of times, and wherein determination of the probability of failure comprises utilizing the number of iterations to reach the threshold value for each of the plurality of times step A5) was carried out.

In an example, in step A2) a probability of selecting the fleet distribution "$F_{dist}$" is calculated on the basis of the effective number of data measurements divided by the sum of the effective number of data measurements and the number of monitor device data measurements "$N_{eff}/(N_{eff}+N_{data})$", and wherein in step A2) a probability of selecting the device distribution "$D_{dist}$" is calculated on the basis of the number of monitor device data measurements divided by the sum of the effective number of data measurements and the number of monitor device data measurements "$N_{data}/(N_{eff}+N_{data})$".

In an example, step A3) comprises randomly selecting the data value from the distribution selected in step A2).

In an example, step f) comprises:

B1) determining a combined distribution utilizing the fleet distribution "$F_{dist}$" and the device distribution "$D_{dist}$".

In an example, data values in the combined distribution are determined as the effective number of data measurements multiplied by the fleet distribution added to the number of monitor device data measurements multiplied by the device distribution, and this whole divided by the sum of the effective number of data measurements and the number of monitor device data measurements "$(N_{eff}*F_{dist}+M_{data}*D_{dist})/(N_{eff}+N_{data})$".

In an example, data values in the combined distribution are determined by applying statistical inference, where the effective number of data measurements "$N_{eff}$" and the number of monitor device data measurements "$N_{data}$" are integral parts of the inference.

In an example, step f) comprises:

B2) taking a start measurement datum from the plurality of device measurement data;

B3) selecting a data value from the combined distribution determined in step B1);

B4) determining a calculated device measurement value determined as the data value selected in step B3) added to the start measurement value for a first iteration or determined as the data value selected in step B3) added to an existing calculated device measurement value for iterations after the first iteration;

B5) iterating steps B3) to B4) until after a number of iterations the calculated device measurement value reaches a threshold value, and wherein determination of the probability of failure comprises utilizing the number of iterations to reach the threshold value.

In an example, the method comprises:

B6) carrying out step B5) a plurality of times, and wherein determination of the probability of failure comprises utilizing the number of iterations to reach the threshold value for each of the plurality of times step B5) was carried out.

In an example, step B3) comprises randomly selecting the data value from the combined distribution.

In an example, step f) comprises:

D1) determining a first probability of failure "Prob1" comprising utilisation of the fleet distribution "$F_{dist}$";

D2) determining a second probability of failure "Prob2" comprising utilization of the device distribution "$D_{dist}$";

D3) determining the failure of the monitored device comprising utilization of the first probability of failure "Prob1" and the second probability of failure "Prob2".

In an example, step D1) comprises modifying a parameter of a synthetic distribution until the synthetic distribution matches the fleet distribution "$F_{dist}$", and wherein step D2) comprises modifying a parameter of a synthetic distribution until the synthetic distribution matches the device distribution "$D_{dist}$".

In other words, a parametric approach is utilized, that is fitting the parameter of an assumed distribution such that it represents as good as possible the empirical distribution of the fleet/device. The parameter can then be used as an indication of the probabilities of failure.

In an example, step D3) comprises determining a combined probability on the basis of the effective number of data measurements multiplied by the first probability of failure added to the number of monitor device data measurements multiplied by the second probability of failure, and this whole divided by the sum of the effective number of data measurements and the number of monitor device data measurements "$(N_{eff}*Prob1+N_{data}*Prob2)/(N_{eff}+N_{data})$".

In a second aspect, there is provided an apparatus for device monitoring, wherein the apparatus is configured to carry out the method of the first aspect.

According to another aspect, there is provided a computer program element controlling apparatus or system as previously described which, when the computer program element is executed by a processing unit, is adapted to perform the method steps as previously described.

According to another aspect, there is also provided a non-transitory computer readable medium having stored the computer element as previously described.

The above aspects and examples will become apparent from and be elucidated with reference to the embodiments described hereinafter.

Figure 2:
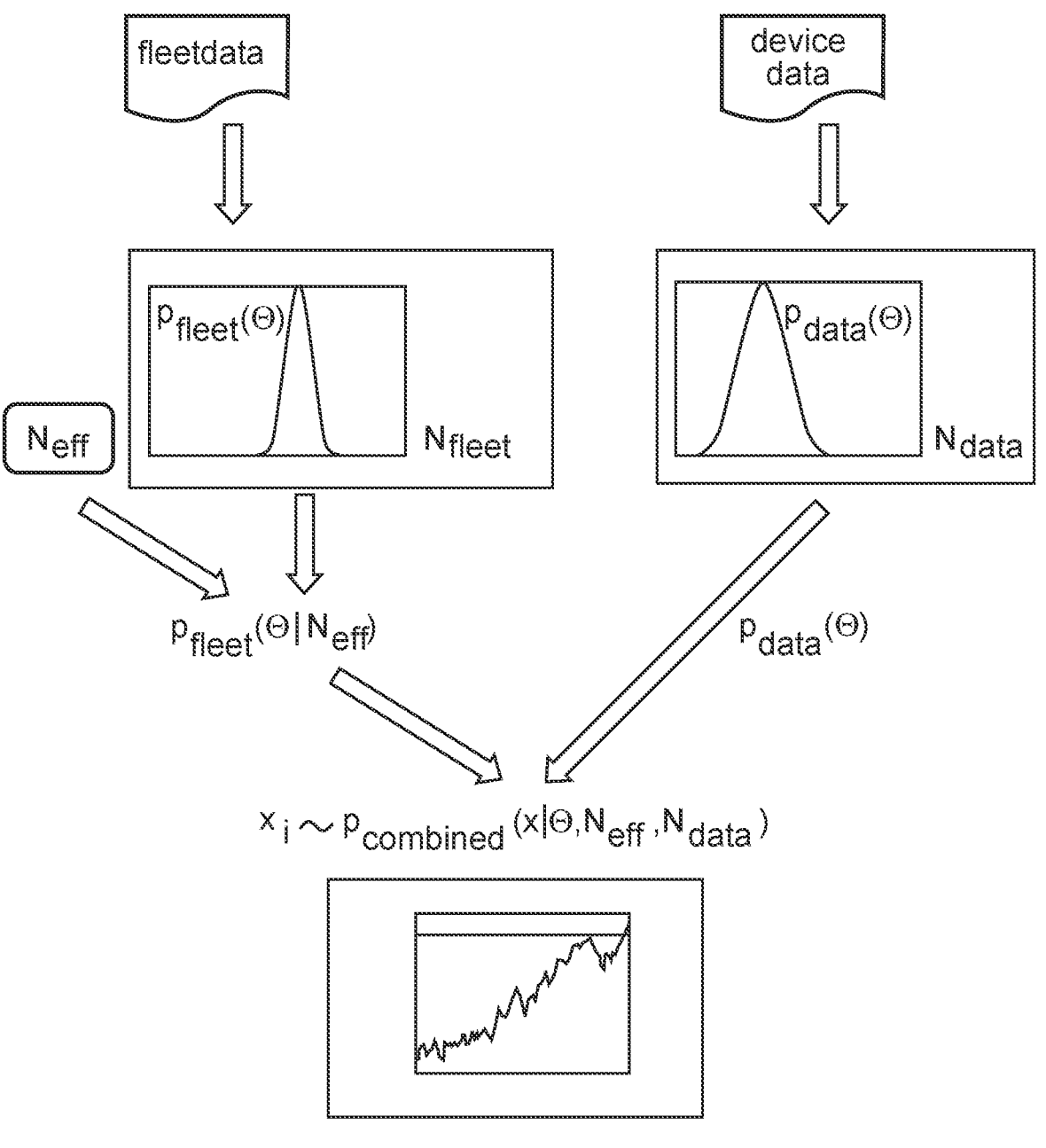
FIG. 2 shows an example of an approach for the determination of a device probability of failure.
Figure 3:
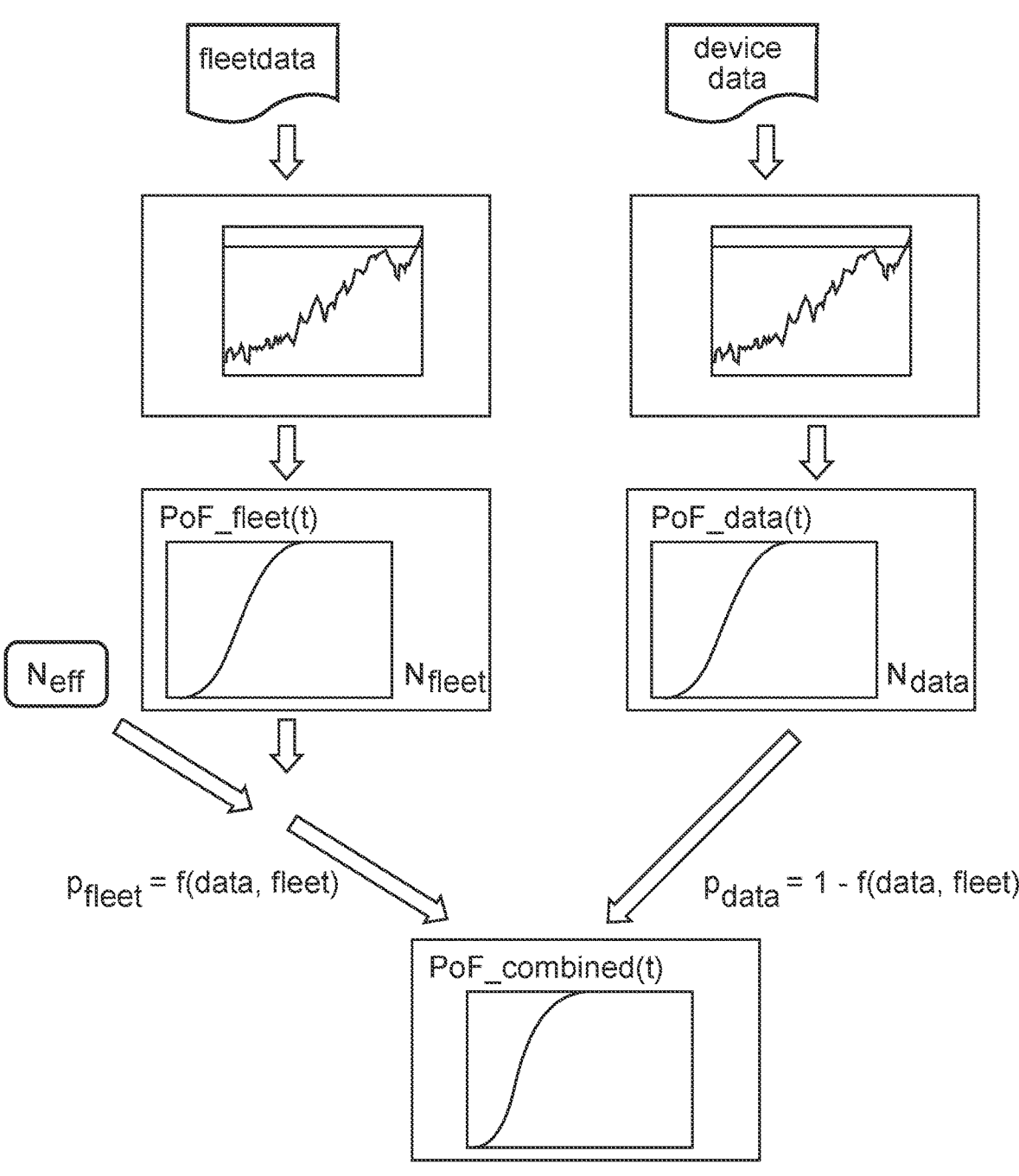
FIG. 3 shows an example of an approach for the determination of a device probability of failure

FIGS. 1-3 relate to a method and apparatus for device monitoring. An example relates to a method for device monitoring. The method comprises:

a) providing a plurality of fleet measurement data for at least one device, wherein the plurality of fleet measurement data comprises a number of fleet device data measurements "$N_{fleet}$";

b) providing a plurality of device measurement data for a monitored device, wherein the plurality of device measurement data comprises a number of monitor device data measurements "$N_{data}$";

c) determining a fleet distribution "$F_{dist}$" determined as a distribution of differences between consecutive measurements of the plurality of fleet measurement data;

d) determining a device distribution "$D_{dist}$" determined as a distribution of differences between consecutive measurements of the device measurement data;

e) determining an effective number of data measurements "$N_{eff}$";

f) determining a probability of failure of the monitored device, the determining comprising utilising the fleet distribution "$F_{dist}$", the device distribution "$D_{dist}$", the number of monitor device data measurements "$N_{data}$", and the effective number of data measurements "$N_{eff}$".

According to an example, in step a) the plurality of fleet measurement data are for a plurality of devices, and wherein in step c) determination of the fleet distribution "$F_{dist}$" comprises determining differences between consecutive measurements for each of the devices.

According to an example, in step e) determining the effective number of data measurements "$N_{eff}$" comprises utilizing the fleet distribution "$F_{dist}$" and/or the device distribution "$D_{dist}$".

According to an example, in step e) the effective number of data measurements "$N_{eff}$" is determined as a fixed value globally.

According to an example, step f) comprises:

X1) taking a start measurement datum from the plurality of device measurement data;

X2) selecting either the fleet distribution "$F_{dist}$" or the device distribution "$D_{dist}$", comprising utilization of at least one probability of selection;

X3) selecting a data value from the distribution selected in step X2); and wherein the probability of failure of the monitored device is determined from a statistical simulation technique starting from the value selected in X1 and using consecutive values selected in a plurality of steps X3).

According to an example, the statistical simulation technique is a Monte Carlo method involving the simulation of a large number of possible future paths.

According to an example, in step X2) a probability of selecting the fleet distribution "$F_{dist}$" is calculated on the basis of the effective number of data measurements divided by the sum of the effective number of data measurements and the number of monitor device data measurements "$N_{eff}/(N_{eff}+N_{data})$", and wherein in step A2) a probability of selecting the device distribution "$D_{dist}$" is calculated on the basis of the number of monitor device data measurements divided by the sum of the effective number of data measurements and the number of monitor device data measurements "$N_{data}/(N_{eff}+N_{data})$".

According to an example, step X3) comprises randomly selecting the data value from the distribution selected in step X2).

According to an example, step f) comprises:

Y1) taking a start measurement datum from the plurality of device measurement data;

Y2) selecting either the fleet distribution "$F_{dist}$" or the device distribution "$D_{dist}$", comprising utilization of at least one probability of selection; and wherein the probability of failure of the monitored device is determined comprising utilization of a mathematically known first-passage distribution for the initial value determined in Y1) and the distribution determined in Y2).

According to an example, in step Y2) a probability of selecting the fleet distribution "$F_{dist}$" is calculated on the basis of the effective number of data measurements divided by the sum of the effective number of data measurements and the number of monitor device data measurements "$N_{eff}/(N_{eff}+N_{data})$", and wherein in step Y2) a probability of selecting the device distribution "$D_{dist}$" is calculated on the basis of the number of monitor device data measurements divided by the sum of the effective number of data measurements and the number of monitor device data measurements "$N_{data}/(N_{eff}+N_{data})$".

According to an example, step f) comprises:

A1) taking a start measurement datum from the plurality of device measurement data;

A2) selecting either the fleet distribution "$F_{dist}$" or the device distribution "$D_{dist}$", comprising utilization of at least one probability of selection;

A3) selecting a data value from the distribution selected in step A2);

A4) determining a calculated device measurement value determined as the data value selected in step A3) added to the start measurement value for a first iteration or determined as the data value selected in step A3) added to an existing calculated device measurement value for iterations after the first iteration;

A5) iterating steps A2) to A4) until after a number of iterations the calculated device measurement value reaches a threshold value, and wherein determination of the probability of failure comprises utilizing the number of iterations to reach the threshold value.

According to an example, the method comprises:

A6) carrying out step A5) a plurality of times, and wherein determination of the probability of failure comprises utilizing the number of iterations to reach the threshold value for each of the plurality of times step A5) was carried out.

According to an example, in step A2) a probability of selecting the fleet distribution "$F_{dist}$" is calculated on the basis of the effective number of data measurements divided by the sum of the effective number of data measurements and the number of monitor device data measurements "$N_{eff}/(N_{eff}+N_{data})$", and wherein in step A2) a probability of selecting the device distribution "$D_{dist}$" is calculated on the basis of the number of monitor device data measurements divided by the sum of the effective number of data measurements and the number of monitor device data measurements "$N_{data}/(N_{eff}+N_{data})$".

According to an example, step A3) comprises randomly selecting the data value from the distribution selected in step A2).

According to an example, step f) comprises:

B1) determining a combined distribution utilizing the fleet distribution "$F_{dist}$" and the device distribution "$D_{dist}$".

According to an example, data values in the combined distribution are determined as the effective number of data measurements multiplied by the fleet distribution added to the number of monitor device data measurements multiplied by the device distribution, and this whole divided by the sum of the effective number of data measurements and the number of monitor device data measurements "$(N_{eff}*F_{dist}+N_{data}*D_{dist})/(N_{eff}+N_{data})$".

According to an example, data values in the combined distribution are determined by applying statistical inference, where the effective number of data measurements "$N_{eff}$" and the number of monitor device data measurements "$N_{data}$" are integral parts of the inference.

According to an example, step f) comprises:

B2) taking a start measurement datum from the plurality of device measurement data;

B3) selecting a data value from the combined distribution determined in step B1);

B4) determining a calculated device measurement value determined as the data value selected in step B3) added to the start measurement value for a first iteration or determined as the data value selected in step B3) added to an existing calculated device measurement value for iterations after the first iteration;

B5) iterating steps B3) to B4) until after a number of iterations the calculated device measurement value reaches a threshold value, and wherein determination of the probability of failure comprises utilizing the number of iterations to reach the threshold value.

According to an example, the method comprises:

B6) carrying out step B5) a plurality of times, and wherein determination of the probability of failure comprises utilizing the number of iterations to reach the threshold value for each of the plurality of times step B5) was carried out.

According to an example, step B3) comprises randomly selecting the data value from the combined distribution.

According to an example, step f) comprises:

D1) determining a first probability of failure "Prob1" comprising utilisation of the fleet distribution "$F_{dist}$";

D2) determining a second probability of failure "Prob2" comprising utilization of the device distribution "$D_{dist}$";

D3) determining the failure of the monitored device comprising utilization of the first probability of failure "Prob1" and the second probability of failure "Prob2".

According to an example, step D1) comprises modifying a parameter of a synthetic distribution until the synthetic distribution matches the fleet distribution "$F_{dist}$", and wherein step D2) comprises modifying a parameter of a synthetic distribution until the synthetic distribution matches the device distribution "$D_{dist}$".

According to an example, step D3) comprises determining a combined probability on the basis of the effective number of data measurements multiplied by the first probability of failure added to the number of monitor device data measurements multiplied by the second probability of failure, and this whole divided by the sum of the effective number of data measurements and the number of monitor device data measurements "$(N_{eff}*Prob1+N_{data}*Prob2)/(N_{eff}+N_{data})$".

From the above, it is clear that an apparatus can be configured to carry out the above described method, thereby providing an apparatus for device monitoring.

Thus, merging of the two data (fleet data and device) happens directly in the determination of the process characteristics, before the future evolution is simulated/determined. A further advantage is that a combination of not homogenous data (device data/failure rate data) is applicable to the hybrid model.

To recall, the simulation or calculation of the future evolution of a degradation variable x requires a good understanding of the underlying process, which often is not deterministic but of a stochastic nature. The properties of this underlying stochastic process can vary from device to device and it specifically these individual properties that need to be used in order to improve a prediction compared to a pure fleet or overall statistical approach. On the other hand, especially for new devices, only very limited data is available and the determination of the underlying process is therefore often very uncertain. This has been addressed in the present approach using the knowledge from the fleet ("prior knowledge") that is combined with the device data to improve the prediction. As time progresses and the amount of device data increases, the relevance of the fleet data is gradually replaced with the better device data.

The developed method described here, combines the fleet data and device data in a consistent way, and with the choice of a parameter that can specify how much the fleet data should be trusted compared to the device data. Additionally, statistical data (from service reports, endurance tests, maintenance assessment etc) can be combined to the fleet data/ device data to be used in parallel to increase the accuracy of the prediction and the robustness of the prognostic algorithms, especially if in the beginning the amount of individual data is not large.

Thus, in summary a hybrid strategy is used to determine the characteristics of the process instead of combining them on the lifetime probability distribution, which is often used. In this new approach a generic/fleet probability distribution is mixed with the one coming from the device in a predetermined way that is changing the weight or emphasis of each model in a predetermined way. Here the merging of the two data happens directly in the determination of the process characteristics, before the future evolution is simulated/ determined. This allows for a more mathematically consistent approach and has the advantage that deviations from the general behaviour are caught based on the device data in a dynamic way. A further advantage is that a combination of not homogenous data (device data/failure rate data) is applicable to the hybrid model. This enables more precise predictions of the remaining lifetime of a device to be determined, with an advantage to the customer allowing for better planning of service and maintenance as well as catching the problem before a failure happens. In order to provide an expected lifetime in the initial phase of a device in operation the usage of fleet data is utilized, but the relevance of the fleet data is gradually reduced as more device data becomes available, in order that the fleet data does not hinder the predictions going forward.

In more detail, a degradation variable $x(t)$ or $x_i$ is under consideration, and specifically of interest is the time evolution of the degradation variable $x(t)$ or $x_i$, that is how a parameter or variable of the device changes over time until it reaches a critical value, which is then defined to be the "failure" of the device. Therefore, with relevance to the present disclosure reference to distribution and parameter, these describe this time evolution.

As a specific example, the variables that are being observed (or measured) are typically those related to the operation of the devices: Timing information, that is time required to e.g. fully open or close the device (such as a circuit breaker), information regarding the speed of a specific part at a specific time, a distance, e.g. an overshoot with respect for normal operation or the level of bouncing. Other variables could be physical properties like the energy stored in a spring, the pressure inside a gas compartment, the amplitude of certain (acoustic) signals at specific frequencies etc. In other areas this can be a battery capacity, resistance value, etc. The important point is, that these correspond to a state of the device, e.g. in contrast to external variables like, temperature, current, external vibration etc.

Typically the time evolution of these variables are described by looking at the difference of two consecutive measurements of them. Here consecutive can mean either two consecutive operations, if the variable, like a timing information, can only be observed during this operation, or at fixed time intervals, if the variable, like the pressure inside a vessel, can be measured independently. As this process is in most cases not of a deterministic type, it needs to be described as a stochastic process, that is, one needs to specify the distribution of value of the next measurement, given the value(s up to) now. This is the distribution F(dist) that is being referred to. It is the distribution of differences of consecutive measurements, e.g. Deltat $x\_i=(x\_i-x\_{(i-1)})$. The distribution D(dist) for a monitored device is similarly determined.

Regarding fleet data with respect to individual data for a device being monitored, the time evolution of the degradation variable is a device specific process, that is, no two devices will behave the same. That is due to the stochastic nature of the process itself (even the same device will not behave the same), but also because the parameters defining the dynamic of the process will be different (some devices will have a stronger trend than others, some will have a larger scatter than other). The fleet of devices then tells us something about the "average" or "expected" parameter or distribution. If no further information from the device being monitored is available, this is then the best that can be used. On the other hand if a large number of operations of a device being monitored have been measured, these can be analyzed to get the parameters or distribution of the individual device (such as a circuit breaker). This is the other extreme and the presently described method enables a gradual transition to be made from one to the other.

Thus fleet data (that is numerous data) from possibly lots of devices is analysed to determine a distribution F(dist) of a degradation variable. As there is lots of data termed N(fleet), this is an accurate representation of the "real" distribution. An analysis is then made to determine an effective number of observations Neff. Thus, this "real" distribution, relates to an "average" or "expected" distribution or parameter. Neff can either come from this, which is not equal to the number of measurements that were taken in total, or can be fixed.

Then, for a monitored device, there is device data (termed N(data)) (where the device is similar to the device or devices that gave the fleet data) for one device, and for which there is not much data but an ever increasing amount of data. This data is analysed to determine a distribution D(dist) of the degradation variable. However, as there is not much data, especially during the initial phase of the lifetime of the device, the distribution is not that good and it is difficult to use it to determine a probability of failure (PoF) or Remaining Useful Life (RUL). The data is however ever increasing, because over time more data is acquired from more and more numbers of operations. Therefore, as discussed above taking only this data into account, this is D(dist).

Typically the number of "observations" that is number of measurements done for the whole fleet is much larger than for the individual device. Therefore, in a simple combination, the data from the fleet would overwhelm that for the monitored device and the data from the device itself would never be seen. Therefore there is a need to downweight the importance of the fleet data. This is achieved in the present method through utilisation of Neff as an "effective" number of observations.

One way to calculate Neff is to compare the overall variability of the fleet and see how this compares to the overall variability of the device given that, only a limited number Ndata measurements have been observed. If both are of the same size (where the one for the device is assumed to decrease with N), this is called Neff. Another way to express this is as a prior knowledge in a Bayesian interpretation. Knowledge before the device is put into operation is not zero. This can be based on the knowledge of the fleet, still having in mind that the individual one can be quite different than the average one. The amount of knowledge can, in Bayesian statistics, be expressed as a number of experiments, that were hypothetically done to get the current knowledge of the device. Whereas these are more mathematical concepts, in reality one can also choose a fixed value of Neff as the one, where the information regarding the fleet becomes equally important to that coming from the measurement on the device.

The aim of the developed prognostic analysis is to understand the future evolution of the degradation variable. As this is a stochastic process, this is not a deterministic evolution, but needs to be described by a probability distribution. The PoF is such a distribution. It records the probability that the degradation variable will cross a certain (predefined) limit in the future. As the process will deviate more and more from the current value, over time this probability will increase until the device will be faulty with probability one.

Typically there are two approaches to calculate the PoF: In the case of known processes, e.g., the so-called Wiener process, there exist analytical expressions that can be used to calculate directly the PoF. A more general approach, which is also more intuitive is making use of the Monte Carlo approach: Here one starts with the current value $x\_i$ and then randomly draw an increment $\Delta x\_{(i+1)}$ from the distribution to get the next value $x\_{(i+1)}=x\_1+\Delta x\_{(i+1)}$. This is repeated again and doing so one possible path the degradation variable could take in the future is obtained. These steps can be repeated until we reach the barrier (threshold), that is the critical value. Then the failure time t fail for this path can be obtained. Overall this then repeated a large number of times. Due to the randomness each path will be slightly different. So overall a large number of possible failure times is determined. The histogram of these is then the predicted PoF.

Thus, distributions in the changes in the degration variable for both the fleet data D(fleet) and for the monitored device data D(dist) are combined making use of the effective number of observations Neff, and the observations for the monitored device Ndata. There are a number of ways of doing this, as explained in more detailed below.

FIG. 1 shows an approach, using a statistical combination of the fleet and the device data. The fleet data is collected and converted into a distribution $F(\Delta)$ also referred to as F(dist), which describes the probability of getting a specific value. The same is done using all available data up to now from the device $D(\Delta)$ also referred to as D(dist). In order to combine the two a two-step process is done. First one selects one of the two distributions randomly with a probability, that is calculated as a function of Neff, the device data and the fleet data, in the simplest case Neff and Ndata. This combined distribution is then used as the basis for the calculation of the further evolution of the degradation variable x (e.g. using a Monte Carlo approach). From this the distribution of the failure times is obtained, that is the PoF(t) and all further KPI, that are derived from it.

Thus, a selection from each distribution is made in a random way. It is assumed that both F(dist) and D(dist) are either in the form of a known distribution, so that values of $\Delta x\_i$ can be sampled from each of them (either because they are in the form of a histogram, or because it is known how to draw random numbers from the distribution). Then a two-step process is set up:

First it is randomly selected which of the two distribution to choose. The probability of choosing F should be given by Neff/(Neff+Ndata), the one of choosing D Ndata/(Neff+Ndata);

Then an increment $\Delta x$ is selected from F(dist) or D(dist). The value is updated and the process is repeated to generate a large number of possible paths until failure.

During the Monte Carlo simulation, the values of Neff and Ndata stay fixed, as they represent the current amount of data.

This two-step approach is one possible way, as it is rather flexible and universal. But of course others could be chosen as well. If the distributions are approximated in a histogram form, these can be combined in a common histogram by adding the density as (Neff*F(dist)+Ndata*D(dist))/(Neff+Ndata).

FIG. 2 shows an approach that relates to combining the parameters of the underlying statistical distribution. In a first step the parameter distribution as inferred from the fleet data is determined and in a second step the same is done for the monitored device data. The distribution of this parameter captures both the value and the certainty. Normally the certainty of the fleet data is not really useful, as it captures the device specific variations. Therefore instead Neff is used in order to construct a distribution, which captures both the best estimation of the parameter of the fleet and an assumed certainty corresponding to the outcome of an effective number of measurements done on the device. In the final step e.g. Bayesian inference is used in order to combine the two to a single distribution. In most cases this is done by calculating a parameter value that is the best one given both fleet and data. This is then used as the basis for the further calculation of the time evolution or directly to get the PoF distribution.

Thus a parametric statistical approach is utilized, where the distribution F(dist) is given as some function $F(\theta\_fleet)$ and D(dist) as some function $F(\theta\_data)$, and by applying statistical inference, e.g. Bayesian statistics, $\theta\_fleet$ and $\theta\_data$ can be combined into a common $\theta\_combined$. In this combination Neff and Ndata are integral parts of the inference.

Therefore a parameter is a value, that describes the distribution of (the difference of consecutive) degradation variables. For example a very common model used for stochastic processes is the Wiener process. In it one describes the increment to be normally distributed, that is each $\Delta x\_i$ is assumed to come from the same normal distribution. To specify the normal distribution one needs on the one hand the mean value mu, which corresponds to the drift of the path, and on the other hand the standard deviation sigma, which describes the variations around this drift. Mean and standard deviations are the two parameters that are needed in this case and therefore need to be determined. In the Monte Carlo approach there is then one normal distribution with parameters determined from the fleet and one normal distribution with parameters determined from the measurements up to now for the monitored device. Data is then drawn from each of them. This is what is shown (assuming that a histogram is used and not the normal distribution) in FIG. 1. In FIG. 2 a different approach is shown. Here the increments are taken from a normal distribution, where the mean and the standard deviations are a combination of the parameters of the fleet and device values. As the most simplest example a weighted average for can be used this:

$$mu=(Neff\ mu\_fleet+Ndata\ mu\_data)/(Neff+Ndata),$$
$$sigma\char`^2=(Neff\ sigma\_fleet\char`^2+Ndata\ sigma\_data\char`^2)/(Neff+Ndata).$$

There are of course more complex ways in statistics on how to combine them, and this is just one illustration of the method.

FIG. 3 shows an approach, where the combination is done not on the level of the time evolution of the degradation variable, but on the PoF. The fleet data is analysed and from it a PoF is derived. This can be done using either a Monte Carlo approach or other methods, e.g., by analysing the failure time distribution directly. In a second step the estimate of the PoF of the device taking into account the device measurements only is calculated. The combination of the two is then done on the level of the two PoF, where again a probability to select one of the two is calculated from Neff, the fleet and the device data.

It is to be noted that in FIGS. 1 and 3 p_fleet=f(data,fleet) and p_data=1−f(data,fleet) are shown, which are the probabilities to select the fleet or the data distribution. These probabilities, have also been termed Prob1 and Prob2. They are used to select either F_dist or D_dist in the combined distribution shown as the histograms in FIG. 1 or the probability of failure distributions PoF_fleet(t) or PoF_data (t) in FIG. 3.

Therefore, in a non-parametric approach the merging of the two data would occur in the following way: Both the fleet data and the device data are collected and are used to infer a distribution of the changes of the degradation variable, for example using a histogram or empirical cumulative distribution function (ecdf) as the basis. The fleet data is much more numerous and therefore is much closer to the real distribution of an average device, whereas the one of the device monitored in the initial phase can only be based on the few observations done and the histogram is rather uncertain. These two distributions are then used to simulate the future evolution of the monitored device. For this the two distributions are merged based on an additional parameter (Neff), which is set to weight the two inputs based on an "effective number of observations" that the fleet data is assumed to correspond to. Future changes of the degradation variable are then drawn from both histograms with a probability depending on the ratio of Neff and the number of observations Ndata of the device. With this a gradual shift from the fleet to the device data is guaranteed, where large deviations of the device are already accounted for early in the simulations. Alternatively the probabilities do not need to be based on this, but could be done based on a "goodness of fit" criterion, that compared how much the device data is similar in its properties to the fleet data (e.g. using a Kolmogorov Smirnov test criterion or similar distribution tests). In this way the device data is used in a way to switch over more quickly in case of a large difference of the specific device from the average or fleet behaviour.

However, in a parametric approach the merging of the two data are done on the parameter level. From the fleet data a first parameter distribution can be determined. Due to the large number of available data (Nfleet) the (average) parameters in this case can be determined rather accurately. This distribution is also static or is typically update only periodically. From the device data a second parameter distribution can be determined. Due to the low amount of data (Ndata) it is rather uncertain. Using as additional input the effective number of observations (Neff) one would consider as being typical for the accuracy of the fleet data when applied to the individual device, a prior fleet data distribution for the parameter is determined. In a third step these two distributions are combined and from this a joined parameter is determined, which can be seen as a weighted value. By using the two parameter distribution a relative weighting based on the agreement of the two or the accuracy of the field data compared to the fleet data is automatically achieved. Finally this joined parameter is used as the basis to predict the future evolution by simulating or analytically calculating the first passage time distribution for this degradation changes distribution.

However, in a further methodology, there is a combination of two different data sources (device/fleet data and statistical failure rate data), and the two different models are applied in parallel. A specific weight function is applied to the KPIs of the two models in order to have a common KPIs for RUL and PoF.

Therefore in summary:

1. Fleet data are used to get a distribution of the changes of the variable within the degradation model;

Alternatively this first distribution can also come from an expert assessment;

2. Device data are acquired on-line up to the current point and used to get a second distribution representing the expected changes of the variables within the degradation model;

3. An additional parameter is used to weight, how much the fleet data is assumed to be applicable to the individual device. This can be in the form of an effective number of measurement points.

4. The two distributions are merged into a combined one, where the relative weighting of each part is chosen in a way, that the increase of knowledge by additional measurements leads to a shift from the generic fleet distribution to the device specific one;

5. The future evolution of the degradation variable, especially its distribution regarding the passage of one or more critical values is calculated either by simulation or other numerical/analytic tools.

Thus overall, in the beginning of the life of the system there are few device data from the sensors and so more importance is given to the statistical data KPIs (they have a decreasing weight function). During the life, more data is collected for the monitored device and the KPIs from device data increase their weight in the result.

Therefore, in a detailed workflow the process begins with the fleet data, where a statistical parameter estimation technique is used to determine the best choice of a parameter of the underlying distribution. MLE (maximum likelihood estimation) is one very common approach. The three parameters in this model are used together with the Neff to construct a prior distribution, that is not only a single value for the three parameters, but a whole distribution. It is one of the features of the model, that Neff can be directly used for this.

Additional, there is device data (for example for a circuit breaker). In a Bayesian approach the prior data are combined with the likelihood of the measurement to get a posterior distribution (which is the core of the Bayesian approach). This is the combination step. From this posterior distribution a single value is again selected, with a procedure called. So this results with three values, which are the combined parameters of the distribution.

In order to use these values for the calculation of the PoF and other KPI, like RUL, there are two possible approaches, which are both possible in this case: This can be done with a Monte Carlo simulation, and when these simulations cross the barrier, the PoF can be constructed. Alternatively in this case there exist an analytic expression to go directly to the PoF.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment of the present disclosure, a non-transitory computer readable medium, such as a CD-ROM, is presented wherein the non-transitory computer readable medium has a computer program element stored on it which computer program element is described by the preceding section.

While one or more embodiments of the present disclosure has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

While one or more embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the present disclosure refer to an embodiment of the present disclosure and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for device monitoring, comprising:
a) providing a plurality of fleet measurement data for at least one device, wherein the plurality of fleet measurement data comprises a number of fleet device data measurements "Nfleet";
b) providing a plurality of device measurement data for a monitored device, wherein the plurality of device measurement data comprises a number of monitor device data measurements "Ndata";
c) determining a fleet distribution "Fdist" determined as a distribution of differences between consecutive measurements of the plurality of fleet measurement data;
d) determining a device distribution "Ddist" determined as a distribution of differences between consecutive measurements of the device measurement data;
e) determining an effective number of data measurements "Neff", "Neff" being a parameter to weight "Fdist" relative to "Ddist"; and
f) determining a probability of failure of the monitored device, the determining comprising utilising the fleet distribution "Fdist," the device distribution "Ddist," the number of monitor device data measurements "Ndata," and the effective number of data measurements "Neff";
scheduling maintenance for the monitored device based at least in part on the probability of failure;
wherein step f) comprises:
A1) taking a start measurement datum from the plurality of device measurement data;
A2) selecting either the fleet distribution "Fdist" or the device distribution "Ddist", comprising utilization of at least one probability of selection;
A3) selecting a data value from the distribution selected in step A2);
A4) determining a calculated device measurement value determined as the data value selected in step A3) added to the start measurement value for a first iteration or determined as the data value selected in step A3) added to an existing calculated device measurement value for iterations after the first iteration; and
A5) iterating steps A2) to A4) until after a number of iterations the calculated device measurement value reaches a threshold failure value indicative of a failure limit of the device measurement value, and wherein determination of the probability of failure comprises utilizing the number of iterations to reach the threshold failure value.

2. The method according to claim 1, wherein:
in step a) the plurality of fleet measurement data are for a plurality of devices, and
in step c) determination of the fleet distribution "Fdist" comprises determining differences between consecutive measurements for each of the devices.

3. The method according to claim 1, wherein in step e) determining the effective number of data measurements "Neff" comprises utilizing the fleet distribution "Fdist" and/or the device distribution "Ddist".

4. The method according to claim 1, wherein in step e) the effective number of data measurements "Neff" is determined as a fixed value globally.

5. The method according to claim 1, wherein step f) further comprises:

A6) carrying out step A5) a plurality of times, and wherein determination of the probability of failure comprises utilizing the number of iterations to reach the threshold failure value for each of the plurality of times step A5) was carried out.

6. The method according to claim 1, wherein:

in step A2) a probability of selecting the fleet distribution "Fdist" is calculated on a basis of the effective number of data measurements divided by the sum of the effective number of data measurements and the number of monitor device data measurements "Neff/(Neff+Ndata)", and in step A2) a probability of selecting the device distribution "Ddist" is calculated on a basis of the number of monitor device data measurements divided by the sum of the effective number of data measurements and the number of monitor device data measurements "Ndata/(Neff+Ndata)".

7. The method according to claim 1, wherein step A3) comprises randomly selecting the data value from the distribution selected in step A2).

8. The method according to claim 1, wherein step f) comprises:

B1) determining a combined distribution utilizing the fleet distribution "Fdist" and the device distribution "Ddist".

9. The method according to claim 8, wherein data values in the combined distribution are determined by summing a product of the effective number of data measurements multiplied by the fleet distribution and a product of the number of monitor device data measurements multiplied by the device distribution, and the sum divided by a sum of the effective number of data measurements and the number of monitor device data measurements "(Neff*Fdist+Ndata*Ddist)/(Neff+Ndata)".

10. The method according to claim 8, wherein data values in the combined distribution are determined by applying statistical inference, where the effective number of data measurements "Neff" and the number of monitor device data measurements "Ndata" are integral parts of the inference.

11. An apparatus for device monitoring, wherein the apparatus is configured to carry out the method of claim 1.

12. A computer program element for controlling an apparatus that is configured to carry out the method of claim 1, which when executed by a processor is configured to carry out the method of claim 1.

13. A non-transitory computer readable medium having stored the computer program element according to claim 12.

14. A method for device monitoring, comprising:

a) providing a plurality of fleet measurement data for at least one device, wherein the plurality of fleet measurement data comprises a number of fleet device data measurements "Nfleet";

b) providing a plurality of device measurement data for a monitored device, wherein the plurality of device measurement data comprises a number of monitor device data measurements "Ndata";

c) determining a fleet distribution "Fdist" determined as a distribution of differences between consecutive measurements of the plurality of fleet measurement data;

d) determining a device distribution "Ddist" determined as a distribution of differences between consecutive measurements of the device measurement data;

e) determining an effective number of data measurements "Neff", "Neff" being a parameter to weight "Fdist" relative to "Ddist"; and f) determining a probability of failure of the monitored device, the determining comprising utilising the fleet distribution "Fdist," the device distribution "Ddist," the number of monitor device data measurements "Ndata," and the effective number of data measurements 'Neff';

scheduling maintenance for the monitored device based at least in part on the probability of failure;

wherein step f) comprises:

X1) taking a start measurement datum from the plurality of device measurement data;

X2) selecting either the fleet distribution "Fdist" or the device distribution "Ddist", comprising utilization of at least one probability of selection; and X3) selecting a data value from the distribution selected in step X2), wherein the probability of failure of the monitored device is determined from a statistical simulation technique starting from the value selected in step X1) and using consecutive values selected in a plurality of steps X3);

in step X2) a probability of selecting the fleet distribution "Fdist" is calculated on a basis of the effective number of data measurements divided by the sum of the effective number of data measurements and the number of monitor device data measurements "Neff/(Neff+Ndata)", and in step A2) a probability of selecting the device distribution "Ddist" is calculated on a basis of the number of monitor device data measurements divided by the sum of the effective number of data measurements and the number of monitor device data measurements "Ndata/(Neff+Ndata)".

15. The method according to claim 14, wherein the statistical simulation technique is a Monte Carlo method involving the simulation of a large number of possible future paths.

16. The method according to claim 14, wherein step X3) comprises randomly selecting the data value from the distribution selected in step X2).

17. A method for device monitoring, comprising:

a) providing a plurality of fleet measurement data for at least one device, wherein the plurality of fleet measurement data comprises a number of fleet device data measurements "Nfleet";

b) providing a plurality of device measurement data for a monitored device, wherein the plurality of device measurement data comprises a number of monitor device data measurements "Ndata";

c) determining a fleet distribution "Fdist" determined as a distribution of differences between consecutive measurements of the plurality of fleet measurement data;

d) determining a device distribution "Ddist" determined as a distribution of differences between consecutive measurements of the device measurement data;

e) determining an effective number of data measurements "Neff", "Neff" being a parameter to weight "Fdist" relative to "Ddist"; and f) determining a probability of failure of the monitored device, the determining comprising utilising the fleet distribution "Fdist," the device distribution "Ddist," the number of monitor device data measurements "Ndata," and the effective number of data measurements "Neff";

scheduling maintenance for the monitored device based at least in part on the probability of failure;

wherein step f) comprises:

Y1) taking a start measurement datum from the plurality of device measurement data; and Y2) selecting either the fleet distribution "Fdist" or the device distribution "Ddist", comprising utilization of at least one probability of selection, wherein the probability of failure of the monitored device is determined comprising utilization of a mathematically known first-passage distribution for the initial value determined in Y1) and the distribution determined in Y2);

in step Y2) a probability of selecting the fleet distribution "Fdist" is calculated on a basis of the effective number of data measurements divided by the sum of the effective number of data measurements and the number of monitor device data measurements "Neff/(Neff+Ndata)", and in step Y2) a probability of selecting the device distribution "Ddist" is calculated on a basis of the number of monitor device data measurements divided by the sum of the effective number of data measurements and the number of monitor device data measurements "Ndata/(Neff+Ndata)".

18. A method for device monitoring, comprising:
a) providing a plurality of fleet measurement data for at least one device, wherein the plurality of fleet measurement data comprises a number of fleet device data measurements "Nfleet";
b) providing a plurality of device measurement data for a monitored device, wherein the plurality of device measurement data comprises a number of monitor device data measurements "Ndata";
c) determining a fleet distribution "Fdist" determined as a distribution of differences between consecutive measurements of the plurality of fleet measurement data;
d) determining a device distribution "Ddist" determined as a distribution of differences between consecutive measurements of the device measurement data;
e) determining an effective number of data measurements "Neff", "Neff" being a parameter to weight "Fdist" relative to "Ddist"; and
f) determining a probability of failure of the monitored device, the determining comprising utilising the fleet distribution "Fdist," the device distribution "Ddist," the number of monitor device data measurements "Ndata," and the effective number of data measurements "Neff";
scheduling maintenance for the monitored device based at least in part on the probability of failure;
wherein step f) comprises:
B1) determining a combined distribution utilizing the fleet distribution "Fdist" and the device distribution "Ddist";
B2) taking a start measurement datum from the plurality of device measurement data;
B3) selecting a data value from the combined distribution determined in step B1);
B4) determining a calculated device measurement value determined as the data value selected in step B3) added to the start measurement value for a first iteration or determined as the data value selected in step B3) added to an existing calculated device measurement value for iterations after the first iteration; and
B5) iterating steps B3) to B4) until after a number of iterations the calculated device measurement value reaches a threshold failure value indicative of a failure limit of the device measurement value, and wherein determination of the probability of failure comprises utilizing the number of iterations to reach the threshold failure value.

19. The method according to claim 18, wherein step f) further comprises:
B6) carrying out step B5) a plurality of times, and wherein determination of the probability of failure comprises utilizing the number of iterations to reach the threshold failure value for each of the plurality of times step B5) was carried out.

20. The method according to claim 18, wherein step B3) comprises randomly selecting the data value from the combined distribution.

21. A method for device monitoring, comprising:
a) providing a plurality of fleet measurement data for at least one device, wherein the plurality of fleet measurement data comprises a number of fleet device data measurements "Nfleet";
b) providing a plurality of device measurement data for a monitored device, wherein the plurality of device measurement data comprises a number of monitor device data measurements "Ndata";
c) determining a fleet distribution "Fdist" determined as a distribution of differences between consecutive measurements of the plurality of fleet measurement data;
d) determining a device distribution "Ddist" determined as a distribution of differences between consecutive measurements of the device measurement data;
e) determining an effective number of data measurements "Neff", "Neff" being a parameter to weight "Fdist" relative to "Ddist"; and
f) determining a probability of failure of the monitored device, the determining comprising utilising the fleet distribution "Fdist," the device distribution "Ddist," the number of monitor device data measurements "Ndata," and the effective number of data measurements "Neff";
scheduling maintenance for the monitored device based at least in part on the probability of failure;
wherein step f) comprises:
D1) determining a first probability of failure "Prob1" comprising utilisation of the fleet distribution "Fdist";
D2) determining a second probability of failure "Prob2" comprising utilization of the device distribution "Ddist"; and
D3) determining the failure of the monitored device comprising utilization of the first probability of failure "Prob1" and the second probability of failure "Prob2";
wherein step D3) comprises determining a combined probability by summing a product of the effective number of data measurements multiplied by the first probability of failure and a product of the number of monitor device data measurements multiplied by the second probability of failure, and the sum divided by a sum of the effective number of data measurements and the number of monitor device data measurements "(Neff Prob1+Ndata*Prob2)/(Neff+Ndata)".

22. The method according to claim 21, wherein:
step D1) comprises modifying a parameter of a synthetic distribution until the synthetic distribution statistically represents the fleet distribution "Fdist", and
step D2) comprises modifying a parameter of a synthetic distribution until the synthetic distribution statistically represents the device distribution "Ddist".

* * * * *